US009803965B2

(12) United States Patent
Thorp et al.

(10) Patent No.: US 9,803,965 B2
(45) Date of Patent: Oct. 31, 2017

(54) PRECISE LENGTH AND AREA MEASUREMENTS BASED UPON GROUND-TRAVERSE DISTANCES AND LOCATION INFORMATION

(71) Applicant: ESTA-mate, LLC, Leawood, KS (US)

(72) Inventors: Todd E. Thorp, Leawood, KS (US); Sean Dusselier, Alpine, WY (US)

(73) Assignee: ESTA-mate, LLC, Leawood, KS (US)

( * ) Notice: Subject to any disclaimer, the term of this patent is extended or adjusted under 35 U.S.C. 154(b) by 218 days.

(21) Appl. No.: 14/859,652

(22) Filed: Sep. 21, 2015

(65) Prior Publication Data

US 2017/0082414 A1   Mar. 23, 2017

(51) Int. Cl.
*G01B 3/12* (2006.01)

(52) U.S. Cl.
CPC ........................... *G01B 3/12* (2013.01)

(58) Field of Classification Search
CPC ......................................................... G01B 3/12
USPC .................. 33/772, 773, 775, 779, 780, 782
See application file for complete search history.

(56) References Cited

U.S. PATENT DOCUMENTS

| 4,176,458 A * | 12/1979 | Dunn ........................ | G01B 3/12 33/781 |
| 2011/0068778 A1* | 3/2011 | Lai ............................ | G01B 3/12 324/207.25 |
| 2013/0133217 A1* | 5/2013 | Lai ............................ | G01B 3/12 33/782 |
| 2015/0160009 A1* | 6/2015 | Bank ........................ | G01C 15/06 33/228 |
| 2015/0276365 A1* | 10/2015 | Wojciechowski ....... | G01B 3/12 33/701 |
| 2016/0102977 A1* | 4/2016 | Ishida et al. ........ | G01C 15/008 33/292 |

FOREIGN PATENT DOCUMENTS

CN          104634222     *  5/2015  ............... G01B 5/02

OTHER PUBLICATIONS https://worldwide.espacenet.com/publicationDetails/biblio?ll=0&ND=3&adjacent=true&locale=en_EP&FT=D&date=20150520&CC=CN&NR=104634222A&KC=A# (Englsh translation of CN 1204634222).*

(Continued)

*Primary Examiner* — G. Bradley Bennett
(74) *Attorney, Agent, or Firm* — Erise IP, P.A.

(57) ABSTRACT

A measuring wheel for determining a ground-traverse distance while operated by a user. The measuring wheel comprising a wheel, a ground-traverse element, a processing element, a memory element, a communications element, and a handle. The wheel has a known radius and is rotatably secured to the ground-traverse element. The ground-traverse element is configured for determining the ground-traverse distance by measuring rotation of the wheel. The processing element, the memory element, and the communications element are located within a central housing of the measuring wheel for receiving and wirelessly communicating information indicative of the ground-traverse distance to an external computing device. The handle is secured to a housing of the ground-traverse element and is configured to be grasped by the user during operation to move the wheel.

19 Claims, 9 Drawing Sheets

(56) References Cited

OTHER PUBLICATIONS

Bosch, "Power Tools for Professionals, GLM 100C Laser Measure with Bluetooth Wireless Technology," Internet: https://www.boschtools.com/us/en/boschtools-ocs/laser-measuring-glm-100-c-50827-p/, printed on Jun. 27, 2016, Posted Date: Unknown, pp. 1-6.
Bagel-Labs, "Bagel: The Tape Measure Made Smarter," P.R. News Release, Internet: https://www.bagel-labs.com/press, printed Jul. 5, 2016, Post Date: Unknown.

* cited by examiner

Job Type:
  Resurfacing

Depth:
  3 inches

Material:
  Asphault

Volume:
  612.325 ft$^2$

Estimated Worker Hours
  34

Customer Information
XYZ Inc.
100 Main Street
Anytown, USA

Bid Summary

Ground - Traverse Distance
  Area A: 200 ft 3.4 inches
  Area B: 37 ft 1 inch

Area Calculation
  Area A: 2500.3 ft$^2$
  Area A: 51 ft$^2$

Total Area Calculation
  2449.3 ft$^2$

Elevation Average
  954 ft

Bid Amount:
$20,500

Special Equipment
Needs: None

Notes:

US 9,803,965 B2

PRECISE LENGTH AND AREA MEASUREMENTS BASED UPON GROUND-TRAVERSE DISTANCES AND LOCATION INFORMATION

BACKGROUND

1. Field

Embodiments of the invention relate to length and area measuring devices. More specifically, embodiments of the invention relate to measuring wheels and other distance measuring devices.

2. Related Art

Measuring wheel devices are well-known in the prior art. Measuring wheels are also known as surveyor's wheels, clickwheels, hodometers, trundle wheels, and perambulators. Generally, a measuring wheel device includes a handle, a wheel, and a ground traverse element. A user places the wheel against the ground and holds the handle. The user then walks between two points. The ground traverse element counts the number of rotations of the wheel (or any fraction thereof) as the wheel travels between the two points. Because the wheel is of a known radius, the ground traverse element can easily determine the distance between the two points.

Measuring wheels of the prior art present several drawbacks. First, these measuring wheels provide only a simple display of the measurements. They have no capacity for recordation or communication of the measurements. This requires the user to precisely record the measurements. It also often requires that the user wait to communicate the measurements to a back office or other third party. Second, the measuring wheels of the prior art are location agnostic. These measuring wheels are not aware of their location or the object they are measuring. This requires the user to precisely record the location and orientation of the measurements. Third, the measuring wheel cannot assist the user in secondary calculations based upon the measurements. For example, if the user is measuring an area on the ground, the user must measure all sides and then manually calculate the area. This can be a complex calculation for irregular shapes. Given all these limitations in the prior art, what is lacking is a smart measuring wheel and a computer program to actively assist the user in obtaining accurate and timely measurements that are immediately useful.

SUMMARY

Embodiments of the invention solve the above-mentioned problems by providing a measuring wheel, a system, a computer program, and a method of precise length and area measurements based upon ground-traverse distances and location information. The measuring wheel internally records and communicates the measurements to an external system (such as a user device of the user or a remote server). The measuring wheel also incorporates waypoint inputs from the user, so as to designate turns, corners, and other landmarks. The measuring wheel and/or the external system then performs secondary calculations such as area calculation, volume calculation, map overlays, and job bid estimations. The external system then uses these secondary calculations to prepare bids, estimates, summaries, or other documents with minimal input by the user.

A first embodiment of the invention is directed to a measuring wheel for determining a ground-traverse distance while operated by a user. The measuring wheel comprises a wheel, a ground-traverse element, a processing element, a memory element, a communications element, and a handle. The wheel has a known radius and is rotatably secured to the ground-traverse element. The ground-traverse element is configured for determining the ground-traverse distance by measuring rotation of the wheel. The processing element, the memory element, and the communications element are located within a central housing of the measuring wheel for receiving and wirelessly communicating information indicative of the ground-traverse distance to an external computing device. The handle is secured to a housing of the ground-traverse element and is configured to be grasped by the user during operation to move the wheel.

A second embodiment of the invention is directed to a system for determining a ground-traverse distance for a user. The system broadly comprises a measuring wheel and a user device. More specifically, the system comprises a non-transitory computer readable medium associated with a measuring wheel having a computer program stored thereon, and a non-transitory computer readable storage medium associated with the user device having a computer program stored thereon. The computer program instructs a first processing element to perform the following steps: acquire a ground-traverse distance from a ground-traverse element of the measuring wheel; acquire a plurality of time stamps related to the ground-traverse distance; and send a set of measurement information to a user device associated with the user. The set of measurement information includes information indicative of the ground-traverse distance and the plurality of timestamps. The computer program instructs a second processing element to perform the following steps: receive the set of measurement information from the measuring wheel; acquire location information from a location element associated with the user device at a time that corresponds with each timestamp of the plurality of timestamps; and determine, based upon said location information, a location stamp that is associated with each time stamp, such that the location stamp approximates the location of the measuring wheel at the time stamp.

A third embodiment of the invention is directed to a computerized method for determining an area of a landmark, the method comprising the following steps: acquire a ground-traverse distance from a ground-traverse element of a measuring wheel, wherein the measuring wheel is being operated by a user to measure the landmark; acquire a plurality of time stamps related to the ground-traverse distance; acquire location information from a location element at a time that corresponds with each timestamp of the plurality of time stamps; determine, based upon said location information, a location stamp that is associated with each time stamp, such that the location stamp approximates the location of the measuring wheel at the time stamp; and calculate an area of the landmark based upon the ground-traverse distance and the location information.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
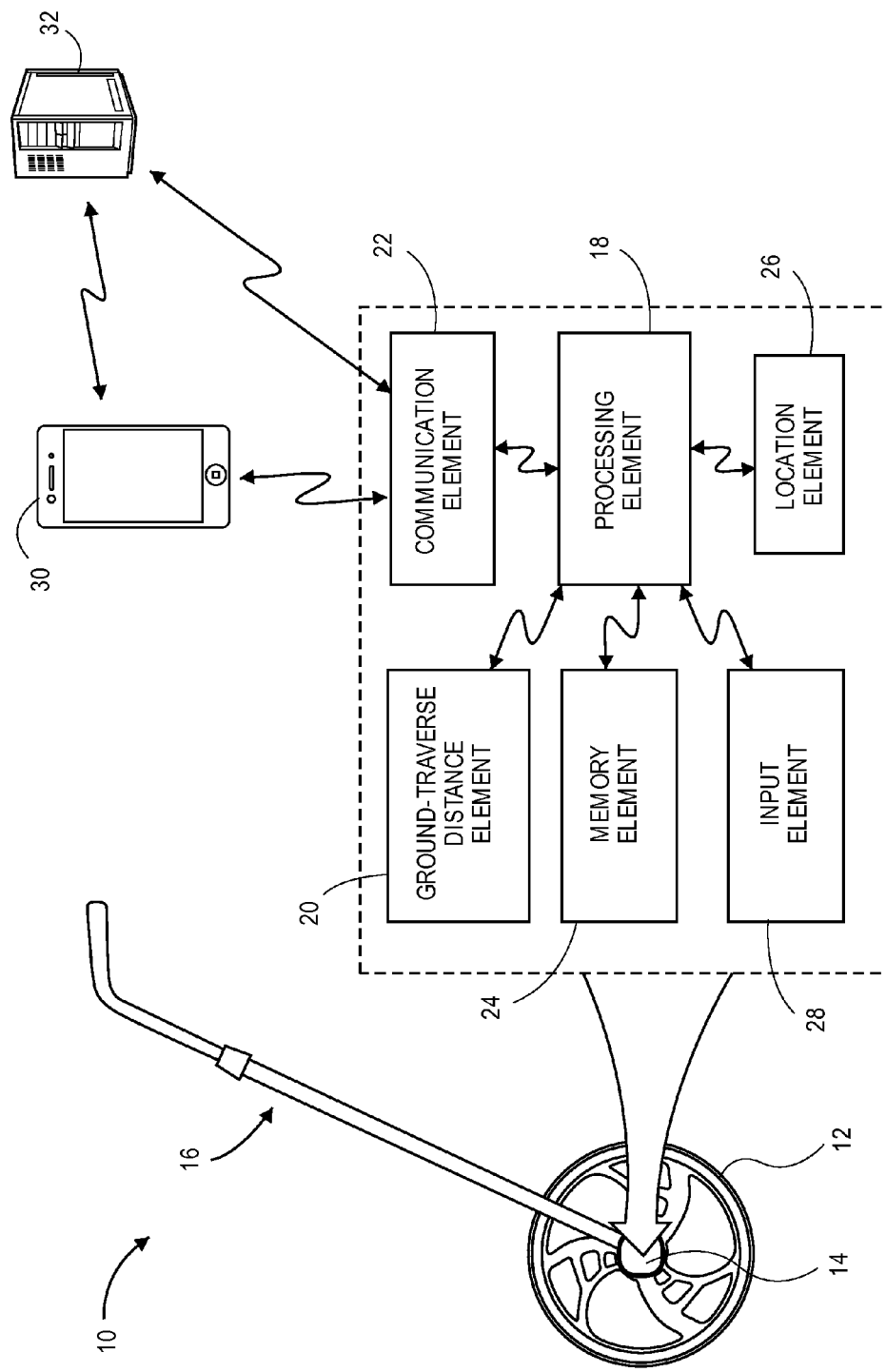
FIG. 1 is a schematic diagram illustrating the internal components of a measuring wheel.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the invention are generally directed to a measuring wheel 10. An operator uses the measuring wheel 10 to measure ground-traverse distances. A ground-traverse distance is a measurement between two locations (a start point and an end point), as measured by the measuring wheel 10 traversing the ground. The ground-traverse distance is a direct measurement and therefore an accurate measurement of the distance between the two locations.

As illustrated in FIG. 1, the measuring wheel 10 includes a wheel 12, a central housing 14, a handle 16, a processing element 18, a ground-traverse element 20, a communications element 22, and a memory element 24. The various components of the measuring wheel 10 are discussed in depth below. The ground-traverse distance is determined by the operator directing the measuring wheel 10 such that the wheel 12 begins on the start point and ends on the end point.

The ground-traverse element 20 measures (either directly or indirectly) the rotation of the wheel 12. The wheel 12 has a known radius. As such, based upon the number of rotations, the ground-traverse element 20 can calculate the ground-traverse distance. The ground-traverse distance is therefore defined as the number of rotations (or fractions thereof) that the wheel 12 rotates multiplied by the circumference of the wheel 12. The circumference of a circle is two times pi (3.1415926 . . . ) times the radius of the wheel 12. For an example calculation, assume that the wheel 12 has a radius of six inches, and the wheel 12 rotates exactly two times between the start point and the end point. The ground-traverse distance would therefore be calculated as two rotations times two times six inches radius times pi. This calculation produces a ground traverse distance of approximately 6.28 feet.

A ground-traverse distance is distinguished from a location-deduced distance. Location-deduced distances are not directly measured or inferred by mathematically calculating the distance between two locations based upon location information for each of the two locations. Instead, location-deduced distances are measured based on GPS-based location information. For example, a person with a GPS unit could take a first locational reading at the start point and take a second locational reading at the end point. Then, utilizing a mathematical formula (or perhaps a function of the GPS unit itself), calculate a distance between those two locations. For example, if the end point was due North from the end point and the difference between the locations for the two locations was 0.1 minutes of latitude, the operator could deduce approximately 600 feet of location-deduced distance between the two locations.

Both ground-traverse distance and location-deduced distance have advantages and disadvantages in determining a distance between two locations. Ground-traverse distance is typically a precise and direct measurement. This allows for accuracy of measurement. However, in certain rough terrain ground traverse distance can lose accuracy. For example, on gravel the wheel 12 can jump or skip and lose accuracy. As another example, an area of thick vegetation may prevent the wheel 12 from passing smoothly along the ground. Location-deduced distance cannot account for rising and falling terrain or non-linear distances without numerous intermediate measurements. Location-deduced distance is also only as accurate as the location information upon which it is based.

Embodiments of the invention therefore rely on a combination of ground-traverse distance with location-deduced distance and/or location information to obtain a more accurate and full description of the distance between two points. For example, in some embodiments of the invention, a ground-traverse distance is compared to a location-deduced distance for the same two locations. This comparison allows for error checking, including information as to the elevation changes and changes in direction. In other embodiments, the ground-traverse distance is overlaid onto a map using the location information of the start point and the end point. In still other embodiments, the location information provides information as to where and to what extent portions of the ground-traverse distance are curved.

It should be appreciated that, while the current detailed description is largely directed to a measuring wheel 10, embodiments of the invention are directed to other measuring apparatuses. These other measuring apparatuses could include tape measures, laser measuring devices, and other direct distance measuring devices. These measuring devices are useful in various situations, such as the measurements of interior spaces or the measurements of objects (both of which can be difficult to accurately accomplish with a measuring wheel 10). Embodiments of the invention would therefore include tape measures, laser measuring devices, measuring wheels or some combination thereof, that utilize the technology described herein.

An exemplary field of use is measuring wheels used by construction crews, repair crews, and the like for measuring distances for construction and repair purposes. For example, an operator would utilize the measuring wheel 10 to measure a parking lot for resurfacing. The operator would measure each side of the parking lot with the measuring wheel 10 and measure each side of any internal segments not to be resurfaced (such as a median or light post, see FIG. 8). As opposed to measuring wheels of the prior art (in which the operator would have to manually transcribe the measurements onto a diagram and then perform area calculations and the like by hand), the measuring wheel 10 performs these secondary calculations automatically or upon request by the operator. The measuring wheel 10 may also provide an overlay onto a map or satellite image depicting the measured location, along with notations as to lengths and areas.

Figure 2:
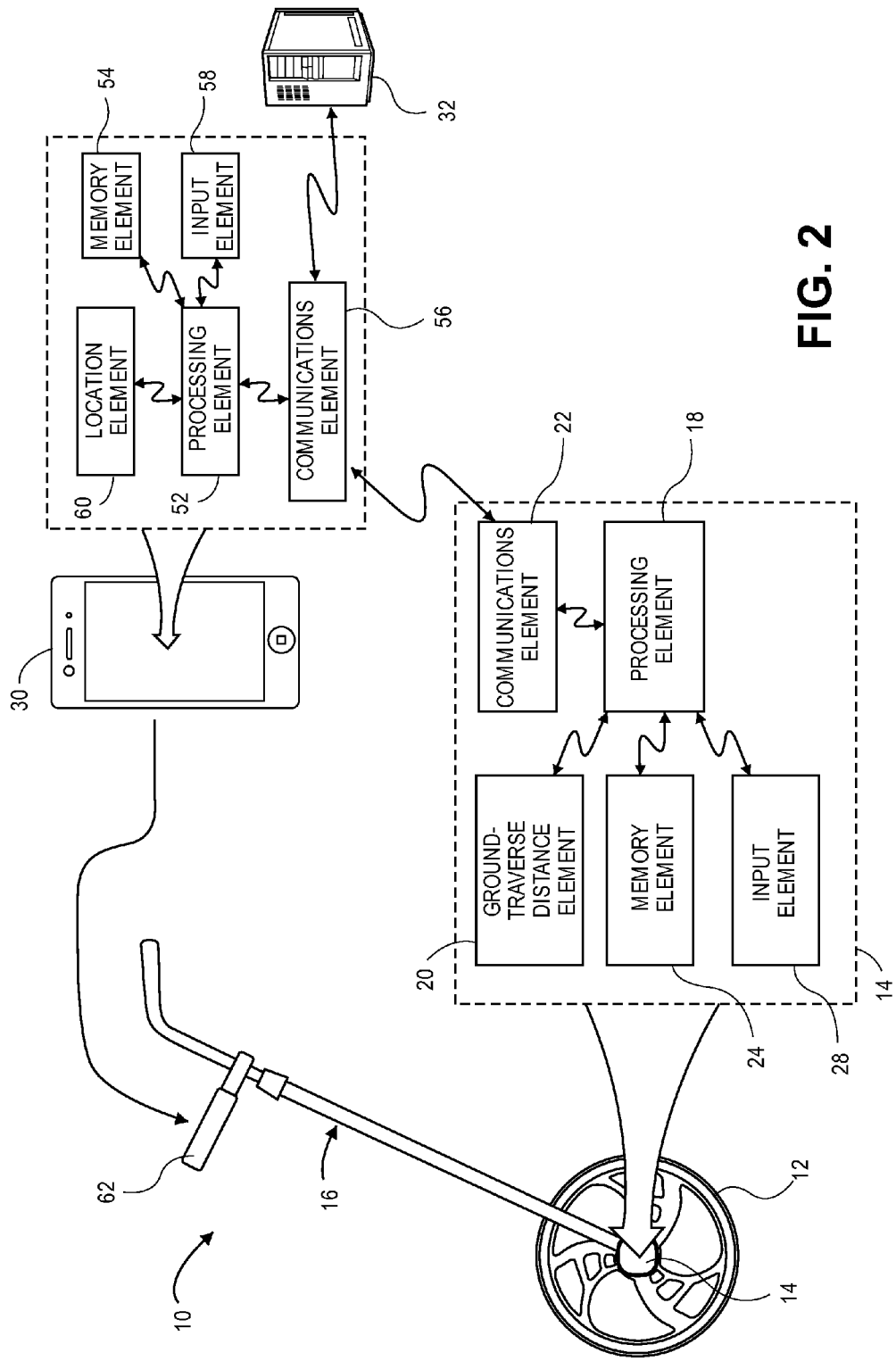
FIG. 2 is a schematic diagram illustrating the internal components of the measuring wheel and a user device.

Turning to FIG. 1, the components of the measuring wheel 10 will now be discussed in detail. As discussed above, the measuring wheel 10 includes the wheel 12, the ground-traverse element 20, the handle 16, the processing element 18, the memory element 24, and the communications element 22. In some embodiments of the invention, the measuring wheel 10 further includes a location element 26 and an input element 28. In other embodiments, such as illustrated in FIG. 2, the location element 26 is located within a user device 30, such as a smart phone.

In embodiments of the invention, certain features of the measuring wheel 10 generally resemble like features of measuring wheels of the prior art. The wheel 12 is rotationally secured to the central housing 14. In embodiments of the invention, the central housing 14 contains the ground-traverse element 20, the processing element 18, the memory element, and the communications element 22. The handle 16 is generally secured to the central housing 14 and extends in a generally upward direction such that it can be grasped by the operator. The operator then places the wheel 12 against the ground to perform the measurement.

The handle 16 is secured to the central housing 14 and extends in a generally upward direction. In some embodiments, the handle 16 includes a static segment 34, a telescoping segment 36, a telescope lock 38, and a handgrip 40. The handle 16 is substantially elongated so as to be at a height comfortable for the operator to grasp during operation. As illustrated in FIG. 1, the handle 16 is configured to be oriented at an angle relative to the ground such that the operator can comfortably push the wheel 12 of the measuring wheel 10 forward during operation. The static segment 34 is permanently secured to the central housing 14 at a proximal end 42 and secured to the telescope lock 38 at a distal end 44.

Figure 3:
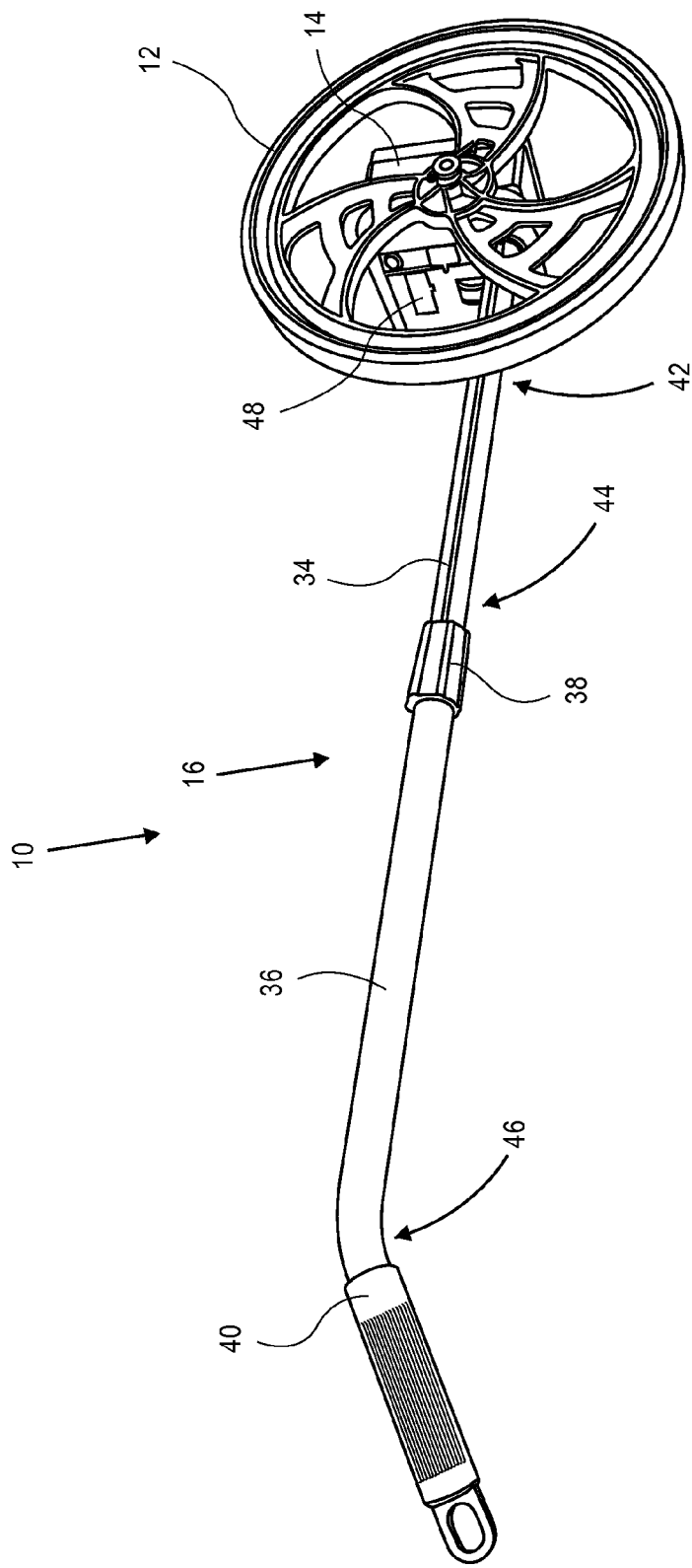
FIG. 3 is a perspective view of the measuring wheel.

The telescoping segment 36 is secured at least partially within the static segment 34. The handgrip 40 is secured at a distal end 46 of the telescoping segment 36. Typically, the handgrip 40 is angled relative to the telescoping segment 36. The angle provides a comfortable gripping angle for the operator when the handle 16 is in operation. As illustrated in FIGS. 1 and 2, the angle may be substantially flat, i.e. parallel with the ground. The handgrip 40 may include a gripping material (as illustrated in FIG. 3) disposed around at east a portion of the handgrip 40 for the comfort of the operator.

The telescope lock 38 is secured around the telescoping segment 36 to keep the telescoping segment 36 secured in a certain position. The telescope lock 38 is configured to be selectively placed in a locked position and an unlocked position. When in the locked position, the telescope lock 38 prevents the telescoping segment 36 from moving relative to the static segment 34. When in the unlocked position, the telescope lock 38 allows the telescoping segment 36 to slide relative to the static segment 34 such that the handle 16 becomes longer and shorter. In some embodiments the telescope lock 38 is changed between positions via a rotation of the telescope lock 38 about the handle 16. In other embodiments, the telescope lock 38 is changed between positions by the pressing of a button, the release of a lever, etc.

In some embodiments, the telescope lock 38 to produce the telescoping action is electronically powered. In these embodiments, the operator may enter a desired length or a default length may be used upon powering on the measuring wheel 10. This may be advantageous for the convenience of the operator, and/or so that the measuring wheel 10 is aware of its length (as discussed below).

In some embodiments, not illustrated, the handle 16 further comprises a second telescoping segment 36 within the telescoping segment 36. The second telescoping segment 36 allows for a greater range of lengths that can be presented by the handle 16. In still other embodiments, the handle 16 comprises a static segment 34 without a telescoping segment 36, such that the handgrip 40 is disposed on the distal end 44 of the static segment 34.

The ground-traverse element 20 is disposed within the central housing 14 for determining the ground-traverse distance traversed by the wheel 12. The ground-traverse element 20 detects rotations (and portions thereof) of the wheel 12. As discussed above, based upon the number of rotations and the known radius of the wheel 12, the ground-traverse element 20 calculates the ground-traverse distance. In some embodiments, the ground-traverse element 20 is a purely mechanical device. In other embodiments, the ground-traverse element 20 is a purely electrical device. In still other embodiments, the ground-traverse element 20 is a hybrid of both mechanical and electrical components. For example, the ground-traverse element 20 may detect rotations mechanically and based upon the received rotation information calculate the distance traversed.

The ground-traverse element 20 may include or communicate with a display 48 for showing the ground-traverse distance to the operator. Typically, the display 48 shows the current ground traverse distance measurement. In some embodiments the display 48 may include a total ground-traverse distance, a current ground-traverse distance (e.g. since the last waypoint), waypoint information (such as a number of waypoints, a distance to the next waypoint if applicable, etc.), location information, time information, a connection status (e.g. a Bluetooth connection with a smartphone or a mobile broadband connection with a remote server, as discussed below), a battery status, final calculations of length and/or area, secondary calculations, etc. In some embodiments, all or a portion of this information may be displayed on the user device 30 (such as a smart phone).

At least one processing element 18 is disposed within the central housing 14 along with at least one memory element. The memory element may include a computer program as described herein for performing the various steps described. The processing element 18 executes the computer program.

At least one communications element 22 is disposed within (or associated with) the central housing 14. The communications element 22 sends information to external systems or computing devices. The communications element 22 also receives information from externals systems and computing devices. For example, the communications element 22 may receive location information from an external location element. The communications element 22 may then send ground-traverse distance information. The processing element 18 interacts with the communications element 22 and instructs the communications element 22 to send, receive, and request certain information.

In some embodiments, the communications element 22 operates wirelessly. The wireless operation allows for substantially real time interactions between the measuring wheel 10 and the various external systems and computing devices. Substantially real time interactions can assist in ensuring a true measurement, e.g. by ensuring that a waypoint indication entered by the operator into the smartphone is rapidly transmitted to the processing element 18 of the measuring wheel 10 to record the waypoint indication and obtain a contemporary reading of the ground-traverse element 20. The communications element 22 utilizes at least one wireless protocol for the sharing of information. For example, the communications element 22 may operate via Bluetooth technology, Wi-Fi technology, mobile broadband technology, or the like. The communications element 22 establishes a connection with the external system or computing device to facilitate communication therebetween.

Figure 4:
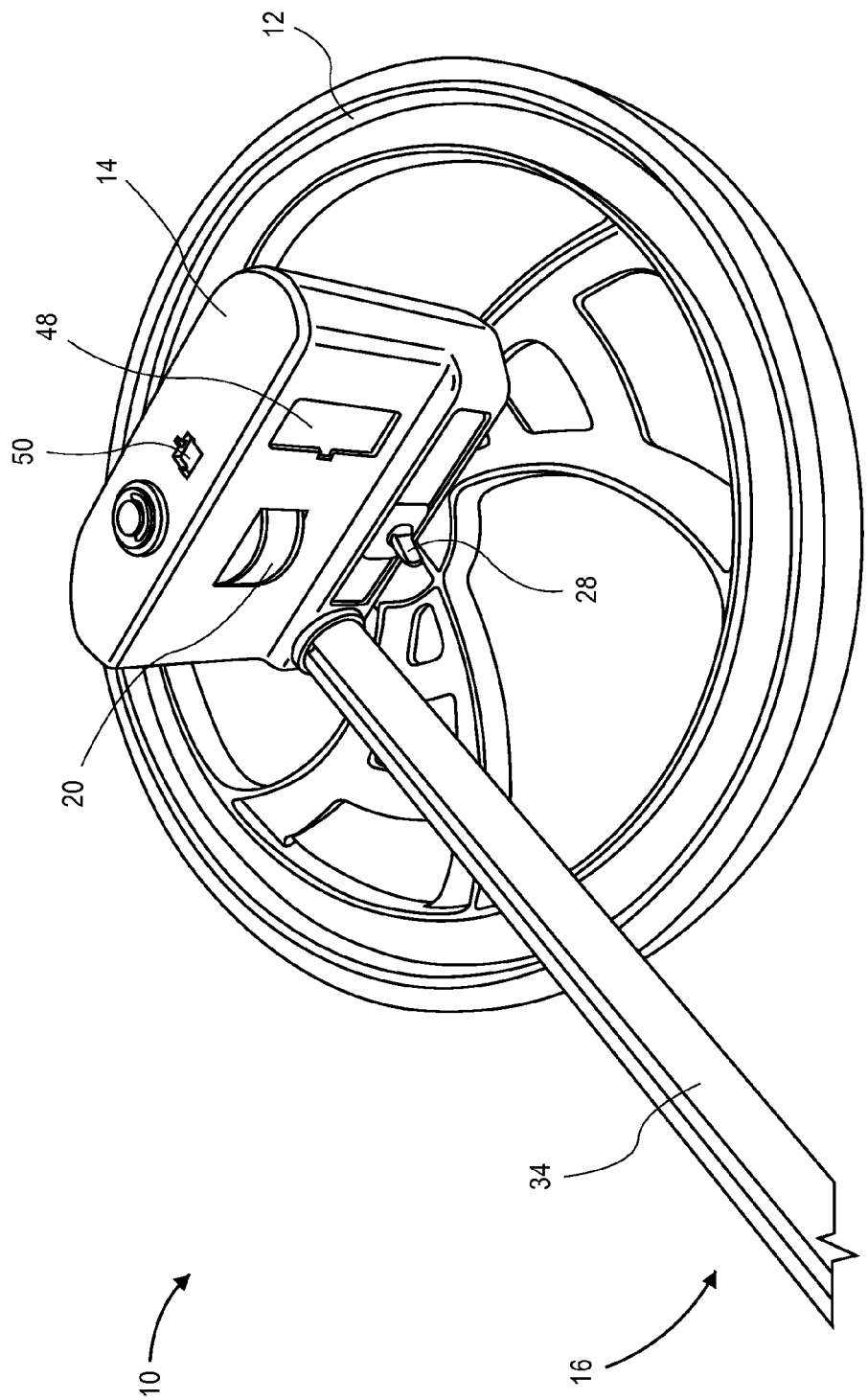
FIG. 4 is a perspective view of the measuring wheel, specifically illustrating a central housing for the various components.

In some embodiments, the communications element 22 operates via a wired connection. In these embodiments the operator plugs a communications cable into a communications port 50 (illustrated in FIG. 4) on the central housing 14 to transmit the information. In some embodiments, the communications element 22 utilizes multiple methods of transmitting information (such as wired and wireless). Examples of the information that may be sent and received by the communications element 22 include ground-traverse distances, location-deduced distances, location information, waypoint information, map information, information relevant to secondary calculations, status information, battery information, authentication information, etc. It should also be noted that in embodiments of the invention the communications element 22 operates via wired and wireless communication.

In embodiments of the invention, the input element 28 may be located on the central housing 14 and/or the handle 16. In addition, or in the alternative, the input element 28 may be a component of the user device 30. Instead of stopping and recording the measurements before each turn, the measuring wheel 10 of embodiments allows the operator to input a waypoint indication. In this way the operator can continue moving more quickly.

The location element 26 provides location information related to the ground-traverse distance. The location element 26 may provide location information continuously at certain intervals, or upon a waypoint indication (discussed below) from the operator. In some embodiments, the location information is used to calculate location-deduced distances. As discussed above, location-deduced distances are measurements of length that are estimations based upon the relative location information for two locations. This may also be compared to the ground-traverse distance that was determined.

In embodiments of the invention, the location element 26 utilizes the Global Positioning System (GPS) to determine the location. The GPS utilizes geosynchronous satellites to determine location information. In other embodiments, the location element 26 utilizes a mobile broadband network, cellular phone network, Wi-Fi networks, or the like to determine location information. In still other embodiments, a combination of the above-mentioned location techniques is utilized to determine location information.

Location elements typically have three types of accuracy: true accuracy, relative accuracy, and repeatable accuracy. True accuracy is the measure of a location reading relative to a known, true location. True accuracy is important in the present invention for providing an accurate overlay. As discussed below, in embodiments of the invention, the system creates an overlay on a map or satellite image of the measured area. Relative accuracy is the accuracy of the location-deduced distance. For example, if one were to take a first reading and then move exactly 100 yards away and take a second reading, relative accuracy is the measure of how true to the 100-yard distance would be calculated by the location element 26. Relative accuracy is important to the present invention for providing accurate location-deduced distances and for accurately measuring angles and curves associated with the ground-traverse distance. Repeatable accuracy is the ability of the location element 26 to achieve a consistent reading despite atmospheric conditions. Repeatable accuracy is important for the present invention because in many instances the invention will be used to measure a certain target on more than one occasion. For example, on a first day an operator may measure a target to generate a bid, and on a second day the operator may return to measure the target again in preparation to perform the task bid.

As illustrated in FIG. 1, the measuring wheel 10 may communicate with an external server 32. Typically, the server 32 is remotely located relative to the measuring wheel 10. In embodiments of the invention, the communications element 22 of the measuring wheel 10 (and/or the smart phone) communicates with the remote server 32 via a mobile broadband network. However, in some fields of use such as manufacturing, the server 32 is located in the vicinity of the measuring wheel 10. In these embodiments the communications element 22 may communicate via Wi-Fi.

The user device 30 is associated with the operator. As illustrated in FIG. 2, the user device 30 typically includes a processing element 52, a memory element 54, a communications element 56, an input element 58, and a location element 60. Typically, the user device 30 is not a permanent component of the measuring wheel 10, but instead is a general-purpose smart phone (or the like) that the operator utilizes in conjunction with the measuring wheel 10. It should be noted that as used herein "user device" can include a smart phone, a cellular phone, a tablet, a smart watch, a laptop computer, or the like. The user device 30 may have an application or computer program (discussed below) that the operator begins or accesses in order to fully utilize the functionality of the measuring wheel 10.

In other embodiments, the smart phone is a dedicated component of the measuring wheel 10. For example, the smart phone may be permanently mounted to the measuring wheel 10 and utilize Bluetooth or wired communications therewith. The smart phone may receive the ground-traverse distance measurements from the ground-traverse element 20 and perform all processing, memory, and communications described herein. In embodiments of the invention, the ground-traverse element 20 may include an output cable and/or an output port for communicating the ground-traverse distance to the smart phone or other external computing device. The output cable may be then plugged into the smart phone. For example, the output cable may be a micro-USB cable, a mini-USB cable, an audio cable, or the like. In these embodiments, the smart phone receives the ground-traverse distance information as a data input.

In embodiments of the invention, as illustrated in FIG. 2, the location element 26 is located with the user device 30. In these embodiments, the handle 16 further comprises a cradle 62 that is configured to hold the computing device. The cradle 62 is secured to the distal end 46 of the telescoping segment 36. The cradle 62 selectively secures the smart phone, tablet, or other user device 30, upon emplacement by the operator. The cradle 62 therefore ensures a smooth and continuous location for the smart phone. Embodiments of the invention will now be discussed with reference to a smart phone, but it should be appreciated that any mobile communications device 30 may be used.

Because, in these embodiments, the location element is located within the smart phone, the relative location of the smart phone and the ground-traverse element 20 is accounted for in the calculations performed. As discussed above, in typical measuring wheels, the operator holds the handgrip 40 such that the wheel 12 is forward of the handgrip 40 and the handle 16 is substantially at an angle relative to the ground. In this configuration, the location element of the smart phone may be located one to two feet behind the ground-traverse element 20. For example, upon the input of a waypoint by the user, the location information at the time of the waypoint may be adjusted to be forward by two feet to adjust for the difference in locations. The 'forward' adjustment is based upon the direction of travel at the time of the waypoint (or just previously thereto). In some embodiments, the elevation aspect of the location information is also adjusted down by the difference in the elevation of the smart phone and the ground-traverse element 20.

In some embodiments, the measuring wheel 10 is aware of the length presented by the handle 16. The measuring wheel 10 may include a length-determining apparatus or may allow for (or prompt) the user to enter this information. This allows the measuring wheel 10 and or the smart phone to correctly account for the discrepancy in location of the location element and the ground-traverse element 20. In other embodiments, an average distance is used. In some embodiments, the cradle 62 is affixed to the static segment 34 of the handle 16, such that there is a fixed distance between the user device 30 and the central housing 14, regardless of the position of the telescoping segment 36.

It should be noted that in embodiments of the invention such as illustrated in FIG. 1 in which the location element 26 is located within measuring wheel 10, the smart phone may be located in the cradle 62 (for ease of viewing by the operator), or may be in a pocket or carried in the hand of the operator. This is because in embodiments of the invention in which the location element 26 is located within the measuring wheel 10, the location information of the smart phone is not utilized directly for measurements.

In some embodiments of the invention, the measuring wheel 10 is configured to mark off a designated distance on the ground. For example, if the task is to build a swimming pool according to a set of plans, the operator will know a desired ground-traverse distance for the measurements. In these embodiments, the measuring wheel 10 may indicate to the operator when the specified distance is achieved. In some embodiments of the invention, a message is displayed on the user device 30. In some embodiments of the invention, the measuring wheel 10 further comprises a speaker (not illustrated) informing the user when a pre-determined ground-traverse distance has been reached. In still other embodiments, the measuring wheel 10 further comprises a ground-marking element (not illustrated) for automatically staking out a landmark based upon ground-traverse measurement to a waypoint. For example, the ground-marking element may include spray paint, chalk, or the like that is sprayed or dropped onto the ground at the designated distance.

Figure 5:
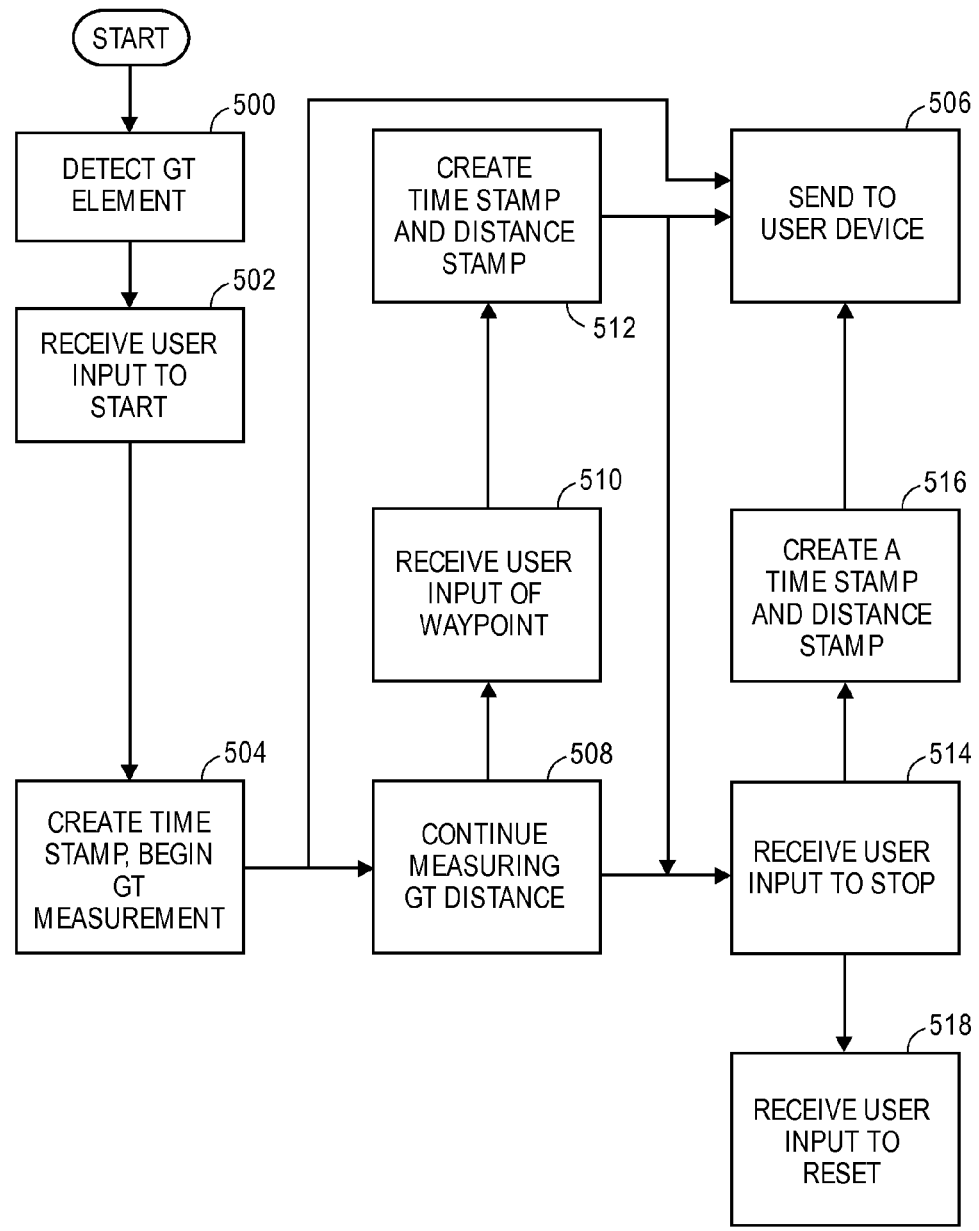
FIG. 5 is a flow diagram illustrating the steps of a method performed by the measuring wheel.

Turning now to FIG. 5, the steps of a method performed by the measuring wheel 10 that lacks a location element (as illustrated in FIG. 2) will now be discussed. In Step 500, the measuring wheel 10 detects the ground-traverse ("GT") element. In Step 502, the measuring wheel 10 receives user input to start the measurement. In some embodiments, the user input is received directly (e.g. through the pressing of a user input button on the measuring wheel 10 or by the powering on of the measuring wheel 10). In other embodiments, the user input is received indirectly from the smart phone.

In Step 504, the measuring wheel 10 creates a time stamp for the beginning of the measurement and begins measuring ground-traverse distance. The timestamp is recorded in the memory element 24, and may include an associated ground-traverse distance (typically 0.0 for the beginning of a measurement). In Step 506, the time stamp and other associated information are sent to the user device 30. The user device 30 may record the timestamp and retrieve location information that corresponds with the time stamp. In some embodiments, the user device 30 takes a current location reading upon receipt of the timestamp. In other embodiments, the location element 26 (or the processing element 52 of the user device 30) keeps a log of location information and corresponding timestamps. Upon the receipt of a timestamp, the processing element 52 of the user device 30 checks the log and associates location information that corresponds to (or mostly closely matches) the timestamp from the measuring wheel 10.

The transmission of the measurements to an external location aids in authentication by reducing administrator error in reading the result. The transmission of measurements also aids in preservation by storing the data in more than one location. This reduces the likelihood of a loss or destruction of the measurements. The transmission of the measurements also aids in presentation by allowing the measurements to be easily and reliably superimposed onto the map overlay or the like and used in calculations. Further, in some fields of use, such as crime scene forensics, verifiability of the results may be advantageous for presentation.

The measurements may be stored in metadata of the measuring wheel 10 and/or the user device 30. Metadata associates one set of data with another set of data. The metadata may be embedded in the captured measurement data, stored externally in a separate file that is associated with the captured measurement data, otherwise associated with the captured measurement data, or all of the above. Embedding the measurements into the same file with the captured measurement data can be advantageous because it allows the metadata to travel as part of the data it describes. Externally stored metadata may also have advantages, such as ease of searching and indexing. The metadata may also be stored in a human-readable format, such that a user can access, understand, and edit the metadata without any special software.

For example, the measurements could be stored in the metadata of the overlay file, bid document, record of the measurement, etc. A user can subsequently superimpose the measurements by accessing the associated metadata. Other information such as the status of the measuring wheel 10 at a certain time or the results of the below-discussed secondary calculations may also be added to the metadata. Some information stored in the metadata may be relatively static, such as a manufacturer name and model of the measuring wheel 10, an identifier assigned to the specific measuring by a controlling entity, a date of the last testing and/or calibration of the measuring wheel 10, a name of the last person to perform the testing and/or calibration, etc. The user may also selectively superimpose the status and/or the relatively static information on the overlay.

Figure 7:
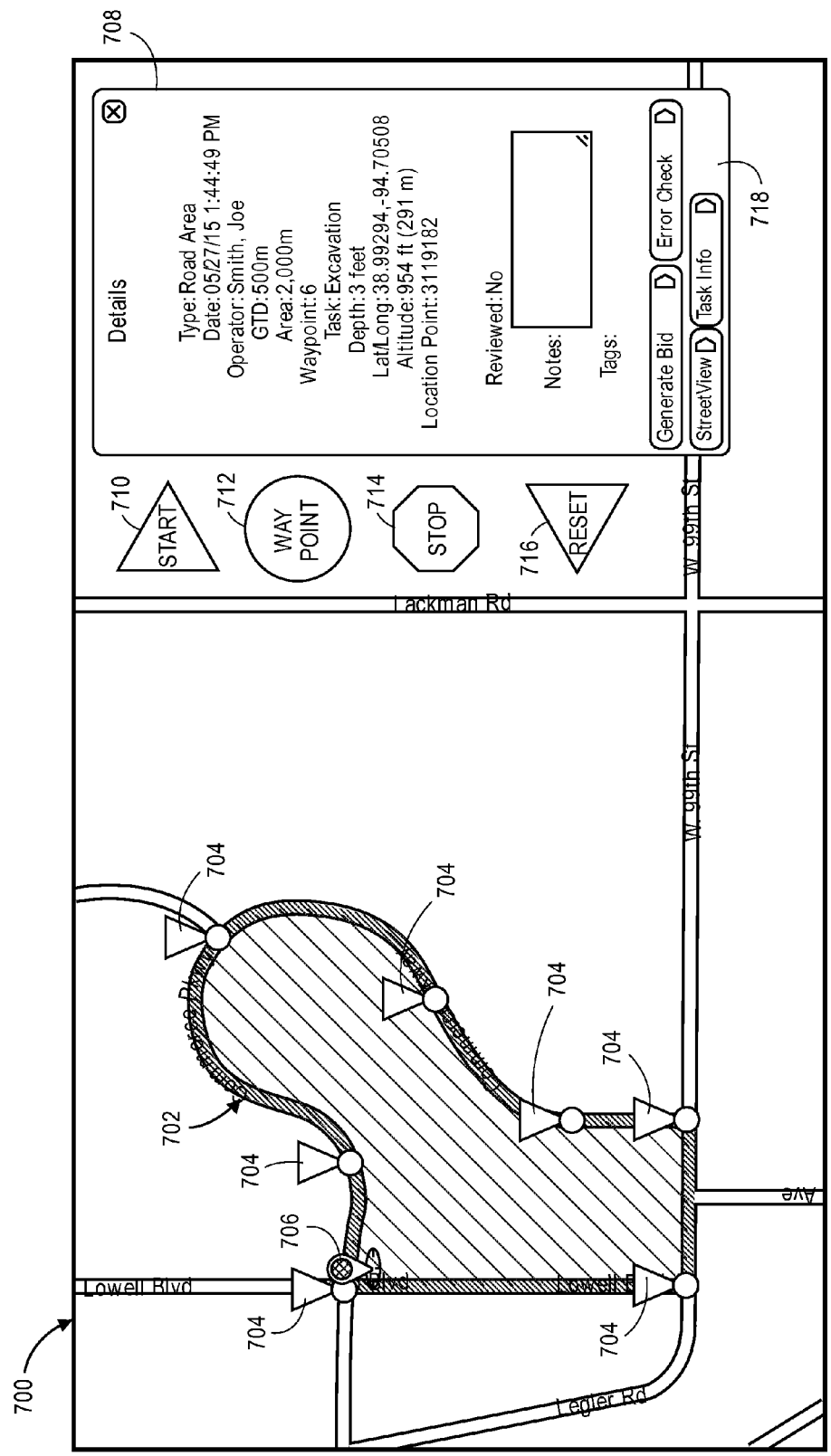
FIG. 7 is an exemplary graphical user interface displaying measurement results.

In Step 508, the measuring wheel 10 continues reading the ground-traverse distance. In Step 510, the measuring wheel 10 receives user input of a waypoint. A waypoint, such as depicted in FIG. 7, is an input from the user indicative of a change of direction, a corner, a certain distance, or the like. As discussed above, in the prior art the operator would physically stop at the waypoint, accurately transcribe the ground-traverse distance, and write the ground-traverse distance onto a diagram of the target being measured. In embodiments of the invention, the operator need only to press a waypoint indication to perform these functions. In Step 512, similarly to Step 504 above, the measuring wheel 10 creates a time stamp associated with the waypoint and sends it to the user device 30. The measuring wheel 10 also creates a distance stamp (which may be a part of or otherwise associated with the time stamp).

The measuring wheel 10 then continues to measure the ground-traverse distance through various waypoints until a stop input is received in Step 514. Similarly to the start input and waypoint inputs, the stop input may be a direct entry into the measuring wheel 10 or an indirect received signal from the user device 30. In Step 516, the measuring wheel 10 creates a time stamp and a distance stamp associated with the final leg of the measurement (i.e. since the last waypoint) and/or the total ground-traverse distance measured. This information is again sent to the user device 30. In Step 518, the measuring wheel 10 receives a user input to reset, i.e. to begin a new measurement. In these instances, the method begins again.

Figure 6:
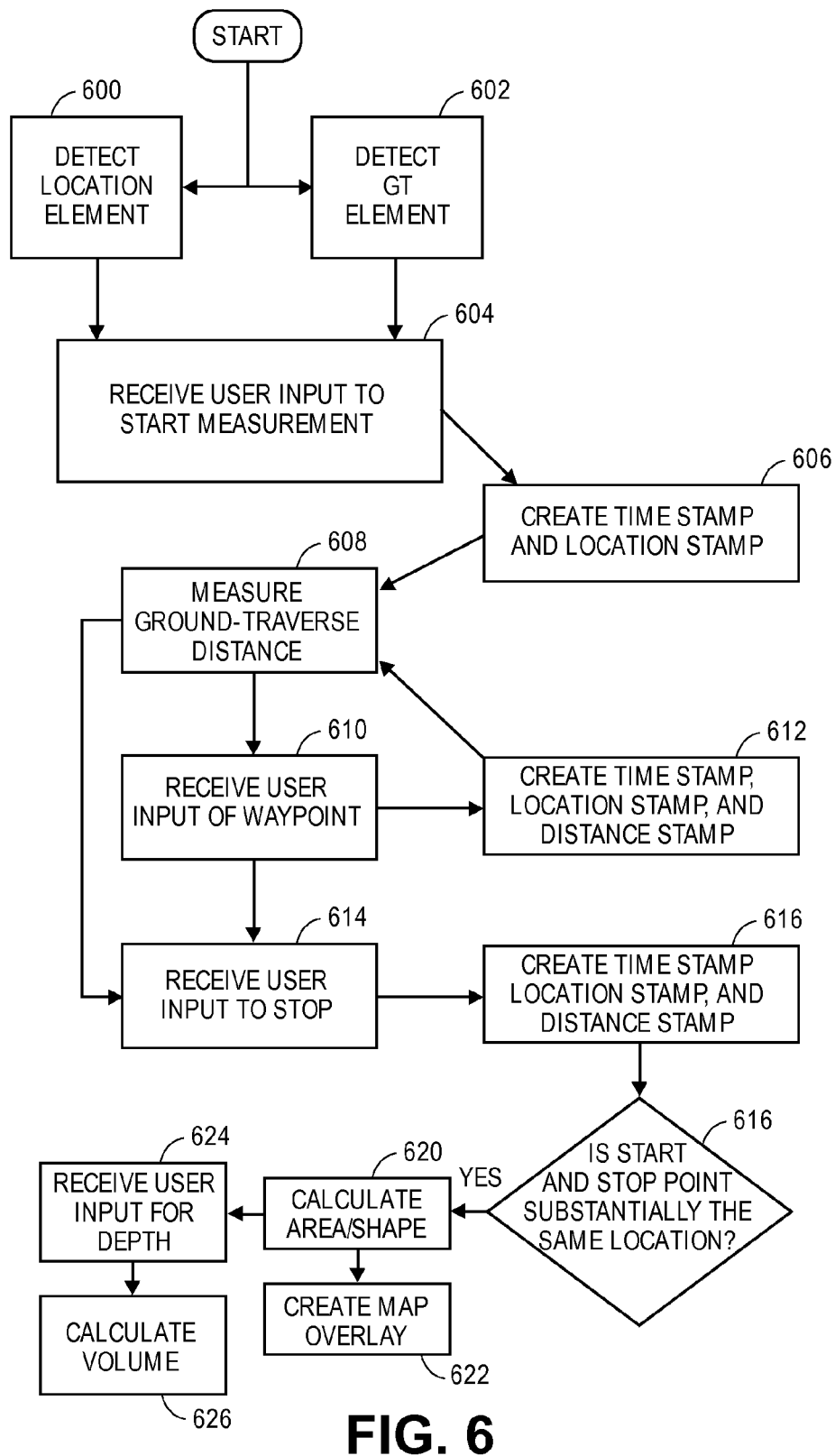
FIG. 6 is a flow diagram illustrating the steps of a method performed by the measuring wheel and/or user device.

Turning now to FIG. 6, the steps of a method as performed by a measuring wheel 10 with a location element 26, and/or a measuring wheel 10 in combination with a user device 30 will now be discussed. In Step 600, the location element 26 is detected, such as via direct electrical connection or wireless communication. Similarly, in Step 602, the ground-traverse element 20 is detected.

In Step 604, user input is received indicative of a desire of the operator to begin a measurement. In Step 606, a time stamp and a location stamp for the start point are created and stored. In Step 608, the ground-traverse element 20 determines ground-traverse distance. In Step 610, a user input indicative of a waypoint is received. In Step 612, a time stamp, a location stamp, and a distance stamp are created based upon the waypoint. As discussed above, the time stamp, the location stamp, and the distance stamp may be within a single set of information or associated with each other. In Step 614, a user input indicative to stop measurement is received. In Step 616, a time stamp, location stamp, and distance stamp are created.

In Step 616, measuring wheel 10 and/or user device 30 determine if the start point and the stop point are in substantially the same location. If not, in Step 618, the measurement is treated as a linear measurement. If the task includes a known width (or other dimension), a linear measurement may be sufficient to describe the measurement. For example, if the task is to replace a section of railroad track, a linear measurement along the railroad track would be adequate to perform secondary calculations and present a map overlay. In other embodiments, a location-deduced distance between the start point and the stop point (based upon location information) is used to create an area.

If the start point and the stop point are substantially in the same location, in Step 620 embodiments of the invention calculate a shape based upon the location information and calculate an area based upon the ground-traverse distances in combination with the location information. Based upon these calculations, embodiments of the invention in Step 622 create a map overlay for displaying a representation of the target that was measured. For example, a satellite image of a parking lot may have an overlay thereon of a portion of said parking lot that was measured for resurfacing. The resurfacing crew that arrives at the work site to perform the task then uses this satellite image to mark out the work area, locate measurements, and otherwise plan the performing of the task. The overlay may include measurements thereon. These measurements may be confirmed by the resurfacing crew.

It should be noted that in the calculation of the shape, the calculation of the area (Step 620), and the creation of the overlay (Step 622), additional location information may be used beyond those associated with waypoints. For example, as shown in FIG. 7, some complex shapes with continuous and non-uniform curves require numerous intermediate sets of location information to be correctly calculated and displayed. In some embodiments, the waypoints are assessed at a certain time and/or distance interval. For example, the location element 26 may take a location reading once per second and associate a current reading of the ground-traverse element 20 with that location stamp. In essence, this creates periodic waypoints. In addition, or in the alternative, at intervals (such as once per foot or once per meter), the ground-traverse element 20 may create a distance stamp and associate a current reading of the location element 26 therewith. In other embodiments, waypoints are presumed based upon changes in direction (based upon location information), pauses in the measuring, etc.

In Step 624, embodiments of the invention receive user input relevant to secondary calculations, such as a depth. Based upon the input information, as well as previously known information, in Step 626 embodiments of the invention then perform secondary calculations, such as calculating a volume. To continue the above example, if the resurfacing requires three inches of new asphalt, the volume of material is the measured area multiplied by three inches. Other examples of secondary calculations include estimations of the weight or size of materials necessary to perform the task, the number of worker hours necessary to perform the task, the number of working days necessary to perform the task, special equipment necessary to perform the task, etc.

Turning to FIG. 7, an exemplary user interface for the user device 30 is shown. The user interface (discussed more below) includes a map 700 or satellite image. The user interface may include an overlay 702, waypoint indications 704, a current location indicator 706, as well as information regarding measurements 708. The user interface may also include the above discussed user inputs, such as start 710, waypoint 712, stop 714, and reset 716. Further, the user interface may provide for additional functions 718. These additional functions may include the generation of a bid (as illustrated in FIG. 8), error checking, street views, and task information.

Error checking may be performed by the system upon a request by the operator or automatically. In embodiments of the invention, an area or linear distance for the target is estimated based upon the satellite image, location information, map information, or the like. This estimated area or distance is then compared to the actual measured value. If the estimated measurement is within a certain threshold tolerance, the actually measured value is confirmed. If not, an error may be suspected. The operator may then override the error (based upon external knowledge) or retake the measurement. Similarly, if the operator forgot to measure a certain leg of the desired target, this may also be reported as an error.

Figure 8:
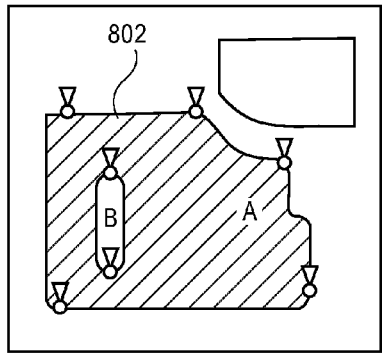
FIG. 8 is an exemplary job bid generated by the system.

Turning to FIG. 8, an example bid is illustrated. The bid is a document that may be presented to a potential client, customer, recipient, or the like. The bid may include measurement information 800, overlay 802, task information 804, customer information 806, and a bid price 808. The bid price is the amount for which the controlling entity would perform the task. Typically, the bid price is determined by adding overhead costs, material costs, worker costs, and a profit amount. Precise measurements as described herein provide more accurate cost estimations that allow the controlling entity to provide more accurate bid prices.

In some embodiments of the invention, the system sends the bid document to a headquarters location for the controlling entity, to the customer, and/or to a government approval office. The controlling entity may finalize and double-check the bid document before sending it on to the customer and/or government office. The controlling entity may also assign a crew to complete the task. The bid document may be delivered to the customer electronically and allow for the customer to electronically approve the bid document. In some embodiments, the customer may be presented with multiple bids via a computer program on a customer device or a website. Similarly, the bid document (or a related approval request form, or both) may be electronically delivered to the government entity for approval. Many large-scale construction projects require government approval before they can legally be performed. In some embodiments, one of the secondary calculations is the determination of whether the bid must be approved by the government entity.

The system of embodiments of the invention may comprise computing devices to facilitate the functions and features described herein. The computing devices may comprise any number and combination of processors, controllers, integrated circuits, programmable logic devices, or other data and signal processing devices for carrying out the functions described herein, and may additionally comprise one or more memory storage devices, transmitters, receivers, displays, and/or communication busses for communicating with the various devices of the system.

Figure 9:
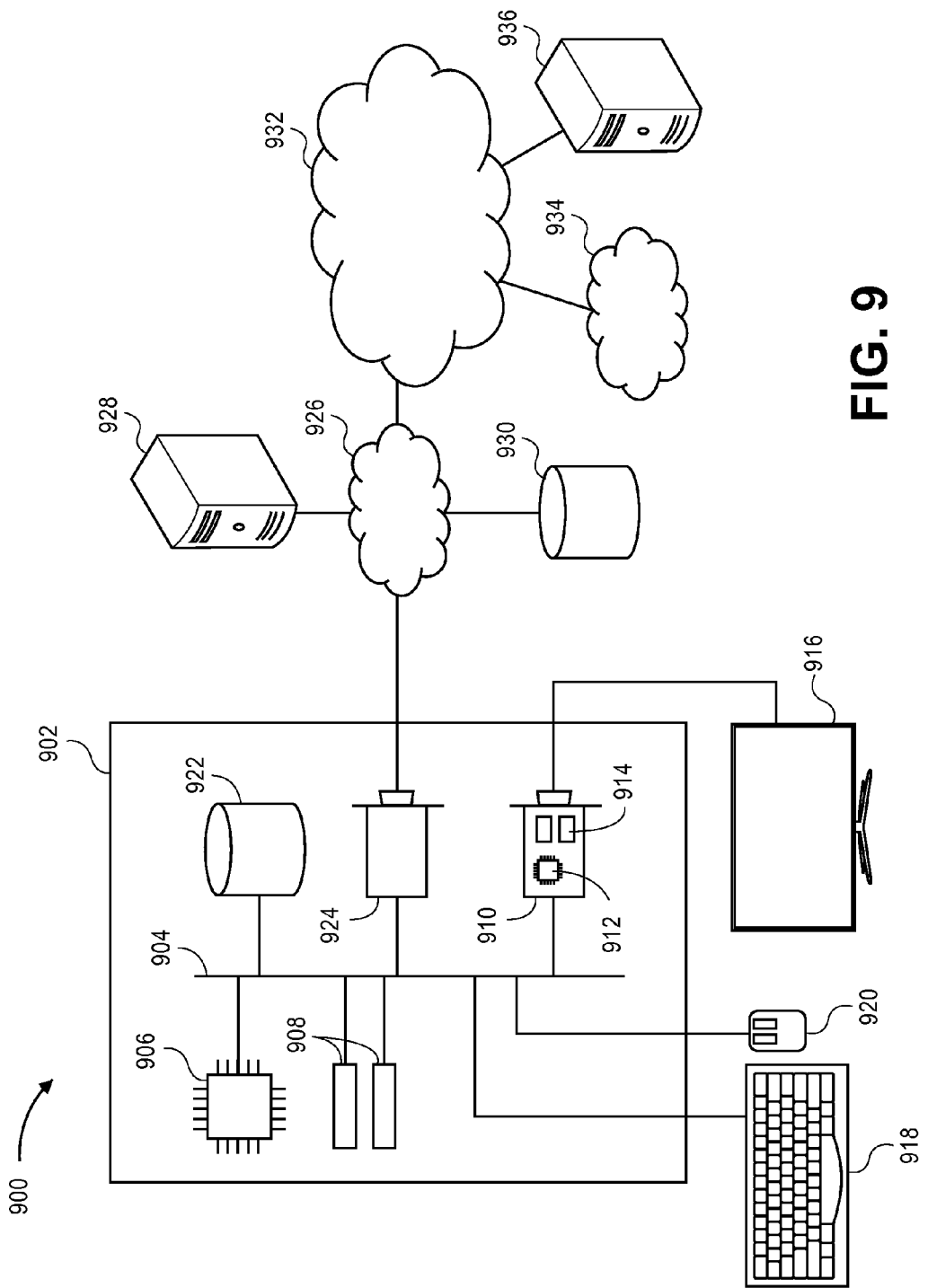
FIG. 9 is a system diagram illustrated the various components of the system.

Turning to FIG. 9, the physical hardware that makes up the system will now be discussed. The system 900 comprising an exemplary hardware platform that can form one element of certain embodiments of the invention is depicted. Computer 902 can be a desktop computer, a laptop computer, a server computer, a mobile device such as a smartphone or tablet, or any other form factor of general- or special-purpose computing device. Depicted with computer 902 are several components, for illustrative purposes. In some embodiments, certain components may be arranged differently or absent. Additional components may also be present. Included in computer 902 is system bus 904, whereby other components of computer 902 can communicate with each other. In certain embodiments, there may be multiple busses or components may communicate with each other directly. Connected to system bus 904 is central processing unit (CPU) 906. Also attached to system bus 904 are one or more random-access memory (RAM) modules 908.

Also attached to system bus 904 is graphics card 910. In some embodiments, graphics card 904 may not be a physically separate card, but rather may be integrated into the motherboard or the CPU 906. In some embodiments, graphics card 910 has a separate graphics-processing unit (GPU) 912, which can be used for graphics processing or for general purpose computing (GPGPU). Also on graphics card 910 is GPU memory 914. Connected (directly or indirectly) to graphics card 910 is display 916 for user interaction. In some embodiments no display is present, while in others it is integrated into computer 902. Similarly, peripherals such as keyboard 918 and mouse 920 are connected to system bus 904. Like display 916, these peripherals may be integrated into computer 902 or absent. Also connected to system bus 904 is local storage 922, which may be any form of computer-readable media, and may be internally installed in computer 902 or externally and removably attached.

Finally, network interface card (NIC) 924 is also attached to system bus 904 and allows computer 902 to communicate over a network such as network 926. NIC 924 can be any form of network interface known in the art, such as Ethernet, ATM, fiber, Bluetooth, or Wi-Fi (i.e., the IEEE 802.11 family of standards). NIC 924 connects computer 902 to local network 926, which may also include one or more other computers, such as computer 928, and network storage, such as data store 930. Local network 926 is in turn connected to Internet 932, which connects many networks such as local network 926, remote network 934 or directly attached computers such as computer 936. In some embodiments, computer 902 can itself be directly connected to Internet 932.

The computer program of embodiments of the invention comprises a plurality of code segments executable by a computing device for performing the steps of various methods of the invention. The steps of the method may be performed in the order discussed, or they may be performed in a different order, unless otherwise expressly stated. Furthermore, some steps may be performed concurrently as opposed to sequentially. Also, some steps may be optional. The computer program may also execute additional steps not described herein. The computer program, system 10, and method of embodiments of the invention may be implemented in hardware, software, firmware, or combinations thereof, which broadly comprises server devices, computing devices, and a communications network.

The computer program of embodiments of the invention may be responsive to user input. As defined herein user input may be received from a variety of computing devices including but not limited to the following: desktops, laptops, calculators, telephones, smartphones, smart watches, in-car computers, camera systems, or tablets. The computing devices may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

The server devices and computing devices may include any device, component, or equipment with a processing element and associated memory elements. The processing element may implement operating systems, and may be capable of executing the computer program, which is also generally known as instructions, commands, software code, executables, applications ("apps"), and the like. The processing element may include processors, microprocessors, microcontrollers, field programmable gate arrays, and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements, the server devices may further include file stores comprising a plurality of hard disk drives, network attached storage, or a separate storage network.

The computing devices may specifically include mobile communication devices (including wireless devices), work stations, desktop computers, laptop computers, palmtop computers, tablet computers, portable digital assistants (PDA), smart phones, and the like, or combinations thereof. Various embodiments of the computing device may also include voice communication devices, such as cell phones and/or smart phones. In preferred embodiments, the computing device will have an electronic display operable to display visual graphics, images, text, etc. In certain embodiments, the computer program facilitates interaction and communication through a GUI that is displayed via the electronic display. The GUI enables the user to interact with the electronic display by touching or pointing at display areas to provide information to the system.

The communications network may be wired or wireless and may include servers, routers, switches, wireless receivers and transmitters, and the like, as well as electrically conductive cables or optical cables. The communications network may also include local, metro, or wide area networks, as well as the Internet, or other cloud networks. Furthermore, the communications network may include cellular or mobile phone networks, as well as landline phone networks, public switched telephone networks, fiber optic networks, or the like.

The computer program may run on computing devices or, alternatively, may run on one or more server devices. In certain embodiments of the invention, the computer program may be embodied in a stand-alone computer program (i.e., an "app") downloaded on a user's computing device or in a web-accessible program that is accessible by the user's computing device via the communications network. As used herein, the stand-along computer program or web-accessible program provides users with access to an electronic resource from which the users can interact with various embodiments of the invention.

Execution of the computer program of embodiments of the invention performs steps of the method of embodiments of the invention. Because multiple users may be updating information stored, displayed, and acted upon by the computer program, information displayed by the computer program is displayed in real-time. "Real-time" as defined herein is when the processing element of the system 10 performs the steps less than every 1 second, every 500 milliseconds, every 100 milliseconds, or every 16 milliseconds.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A measuring wheel for determining a shape of a landmark while operated by a user, the measuring wheel comprising:
   a wheel having a radius;
   a ground-traverse element rotatably associated with the wheel,
   said ground-traverse element configured for determining the ground-traverse distance by measuring rotation of the wheel;
   a processing element;
   a memory element;
   a communications element configured to communicate information indicative of the ground-traverse distance to a computing device associated with a location element configured to generate a set of location information,
   wherein the ground-traverse distance is compared to the set of location information to determine a shape; and
   a handle secured to a housing of the ground-traverse element configured to be grasped by the user during operation to move the wheel.

2. The measuring wheel of claim 1, wherein the processing element associates the location information with the ground-traverse distance.

3. The measuring wheel of claim 1, wherein the external computing device is a remote server.

4. The measuring wheel of claim 1, wherein the external source is a user device, selected from a group consisting of a smart phone and a tablet.

5. The measuring wheel of claim 4, further comprising a cradle to support the user device during operation.

6. The measuring wheel of claim 1,
   wherein the user device sends to the control unit information indicative of user input into the user device,
   wherein the user input includes a start command, a waypoint indication, and a stop command.

7. The measuring wheel of claim 1, further comprising:
   a speaker informing the user when a pre-determined ground-traverse distance has been reached; and
   a ground-marking element for automatically staking out a landmark based upon ground-traverse measurement to a waypoint.

8. A system for determining a ground-traverse distance for a user, the system comprising:
   a non-transitory computer readable medium associated with a measuring wheel having a computer program stored thereon, wherein the computer program instructs a first processing element to perform the following steps:
      acquire a ground-traverse distance from a ground-traverse element of the measuring wheel;
      acquire a plurality of time stamps related to the ground-traverse distance;
      sending a set of measurement information to a user device associated with the user;
      wherein the set of measurement information includes information indicative of the ground-traverse distance and the plurality of time stamps; and
   a non-transitory computer readable storage medium associated with the user device having a computer program stored thereon, wherein the computer program instructs a second processing element to perform the following steps:
      receive the set of measurement information from the measuring wheel;

acquire location information from a location element associated with the user device at a time that corresponds with each timestamp of the plurality of time stamps;

determine, based upon said location information, a location stamp that is associated with each time stamp, such that the location stamp approximates the location of the measuring wheel at the time stamp.

9. The system of claim 8, further comprising:

a non-transitory computer readable storage medium associated with a server device having a computer program stored thereon, wherein the computer program instructs a third processing element to perform the following steps:

receive, from the user device, the measurement information and the associated location stamps;

render a satellite image based upon the location information; and overlay a depiction of measurement information onto the rendered satellite image.

10. The system of claim 8, wherein the user device further performs the steps of:

rendering a satellite image based upon the location information; and overlay a depiction of measurement information onto the rendered satellite image.

11. The system of claim 8, wherein the user device further performs the steps of:

calculating an area based upon the measurement information and the location information.

12. The system of claim 11, wherein the location information includes elevation information, such that the area calculated accounts for changing elevation.

13. The system of claim 8, wherein the location stamp accounts for a known discrepancy in the relative location of the user device and the measuring wheel.

14. The system of claim 8, wherein the computer program associated with the measuring wheel performs the following steps: receive a waypoint indication from the user, and sending the waypoint indication to the user device.

15. The system of claim 8, performing secondary calculations based upon the calculated area and the location information, said secondary calculation being related to the performance of a task related to the landmark.

16. A computerized method for determining an area of a landmark, the method comprising the following steps:

acquire a ground-traverse distance from a ground-traverse element of a measuring wheel, wherein the measuring wheel is being operated by a user to measure the landmark;

acquire a plurality of time stamps related to the ground-traverse distance;

acquire location information from a location element at a time that corresponds with each timestamp of the plurality of time stamps;

determine, based upon said location information, a location stamp that is associated with each time stamp, such that the location stamp approximates the location of the measuring wheel at the time stamp; and calculate an area of the landmark based upon the ground-traverse distance and the location information.

17. The computerized method of claim 16, further comprising the following step:

perform secondary calculations based upon the calculated area and the location information, and secondary calculations being related to the performance of a task related to the landmark.

18. The computerized method of claim 17, further comprising the following step:

generate a bid document based upon the secondary calculations.

19. The computerized method of claim 16, further comprising the following steps:

render a satellite image based upon the location information;

overlay a depiction of measurement information onto the rendered satellite image;

calculate a map estimate area of the landmark; and compare the map estimate area to the calculated area of the landmark.

* * * * *